United States Patent [19]

Fraioli

[11] Patent Number: 5,067,523
[45] Date of Patent: Nov. 26, 1991

[54] AIR-GAS CONTROLLER UNIT

[76] Inventor: Joseph Fraioli, 8 Seymour Pl., White Plains, N.Y. 10605

[21] Appl. No.: 610,072

[22] Filed: Nov. 7, 1990

[51] Int. Cl.$^5$ .......................................... F16K 11/076
[52] U.S. Cl. .............................. 137/625.41; 123/527
[58] Field of Search ...................... 137/625.41, 625.47, 137/114; 123/527

[56] References Cited

U.S. PATENT DOCUMENTS

| | | | |
|---|---|---|---|
| 1,136,276 | 4/1915 | Scaife | 137/625.41 |
| 3,034,533 | 5/1962 | Black | 137/625.41 X |
| 3,286,735 | 11/1966 | Yindrock | 137/625.41 |

FOREIGN PATENT DOCUMENTS

| | | | |
|---|---|---|---|
| 596173 | 4/1960 | Canada | 137/625.41 |
| 123826 | 7/1919 | United Kingdom | 123/527 |

Primary Examiner—Stephen M. Hepperle
Attorney, Agent, or Firm—Michael Ebert

[57] ABSTRACT

An air-gas controller unit to supply a gas-fired burner with a combustible air-gas mixture, the unit serving to modulate the volumetric flow rate of the mixture without, however, altering the ratio of air to gas which is pre-set for optimum combustion efficiency. The unit includes a valve body whose cylindrical cavity accommodates a hollow cylinder functioning as a mixing chamber, one end of which is open to discharge the air-gas mixture into a mixture outlet in the valve body. The cylinder is turnable within the cavity from a maximum to a minimum valve setting by a rotary control element attached to its other end. Formed in the cylinder is an air orifice which at maximum setting lies in full registration with a gas inlet in the valve body. Also formed in the cylinder is a gas orifice which at maximum setting lies in full registration with a gas inlet in the valve body. The relative portions of the orifices are such as to afford a desired ratio between the air and gas fed into the mixing chamber. As the cylinder is turned toward minimum setting, the air and gas orifices proceed, in corresponding degrees, to fall out of registration with their respective inlets, thereby adjusting the volumetric flow rate of air and gas admitted into the chamber while maintaining the ratio therebetween.

8 Claims, 3 Drawing Sheets

AIR-GAS CONTROLLER UNIT

BACKGROUND OF INVENTION

1. Field of Invention

This invention relates generally to controller valves for gas-fired burners which are supplied with a combustible mixture of air and gas, and more particularly to an air-gas controller unit that serves to modulate the volumetric flow rate of the air-gas mixture fed into the burner without, however, altering the ratio between the air and the gas which is preset for optimum combustion efficiency.

2. Status of Prior Art

Among gaseous fuels used in gas-fired burners and furnaces are natural gas and gas derived from coal as well as other petrochemical products. My prior 1984 U.S. Pat. No. 4,432,727 (Fraioli) discloses an infra-red heater in which a flame produced by a gas fired burner impinges on a refractory body that when heated radiates infrared energy to an extent depending on the intensity of the flame. This gas-fired burner is constituted by a cylinder into which is fed the air-gas mixture, the cylinder having a longitudinal slot occupied by corrugated ribbons whereby when the mixture is ignited, a sheet-like flame is emitted from the slot. Similar gas-fired burners are disclosed in the Flynn U.S. Pat. Nos. 3,437,322 and 4,042,317.

In my prior 1984 patent, a pressurized stream of air and gas is fed through separate lines into a mixing control system which includes separately-operated valves, thereby making it possible to control the ratio of air to gas in the mixture supplied to the burner to provide a desired stoichiometric ratio and to maintain this ratio at various valve settings. In this way, one can accurately vary the intensity of the flame produced by the burner and the resultant temperature of the refractory surface of the infrared burner.

Though the invention is of particular advantage in the context of a gas-fired burner which acts as a heat source for an infrared heater, it is by no means limited to this application, for the need exists in all types of gas-fired burners or furnaces for means to maintain a desired ratio of air to gas when adjusting the volumetric flow rate of these constituents to vary the heating temperature produced by the burner or furnace.

For example, should one feed into a gas-fired burner through separate valves a supply of gas and air, these valves may initially be set so that the ratio of air to gas provides complete combustion in the burner. In the case of methane gas, the stoichiometric ratio for complete combustion is 64 grams of oxygen to 16 grams of methane. However, every chemical reaction has its characteristic proportions; hence the ratio for optimum efficiency will depend on the gaseous fuel being used.

But once the desired ratio of air to gas is established by means of separate valves in the air and gas lines leading to the burner, one is then faced with the problem of varying the intensity of the flame without upsetting the desired ratio. Thus if one wishes to increase the intensity of heat yielded by the burner, it is not sufficient to further open the gas control valve, for it is also then necessary to further open the air control valve to provide more combustion air without, however, changing the existing ratio of air to gas. Should an adjustment be made which disturbs the proper ratio, the burner system, though it will supply more or less heat depending on the adjustment, will not then operate efficiently and will waste gas and thereby make the system more expensive to operate.

With prior art arrangements in which an adjustment is made through separately-operated gas and air control valves, it is difficult for an operator to increase or decrease the intensity of the flame without upsetting the desired ratio. This problem is particularly bothersome in commercial installations in which the operator may be lacking in skill and may not be aware that when adjusting the flame he must also be sure that optimum combustion efficiency is being maintained.

My prior 1987 U.S. Pat. No. 4,640,678 (Fraioli) discloses a dual-valve controller having an air-control valve and a gas-control valve, both of which are concurrently adjusted to supply an air-gas combustible mixture to a gas-fired burner. The unique feature of this dual-valve controller is that a single rotary control element acts to effect concurrent adjustment, for when this element is manually turned by an operator, it functions to more or less open both valves to corresponding degrees, thereby adjusting the volumetric flow rate of the air and gas. But in making this adjustment, the air-gas ratio, which is pre-set for optimum combustion efficiency, is not altered.

The practical drawback of my patented dual-valve controller is that it is a relatively complex mechanism, for not only does it require separate air and gas control valves, but also a fairly elaborate cam structure for operating both valves concurrently. As a consequence, this dual-valve controller, though it functions effectively and makes it possible for an operator with a single control element to adjust the volumetric flow rate of the air-gas mixture, is quite expensive to manufacture. The resultant high selling price has discouraged the widespread commercial adoption of the dual-valve controller.

SUMMARY OF INVENTION

In view of the foregoing, the main object of this invention is to provide an improved air-gas controller unit for supplying a gas-fired burner with a combustible mixture of air and gaseous fuel, the unit acting to modulate the volumetric flow rate of the mixture without, however, altering the ratio between the air and gas which is pre-set for optimum combustion efficiency.

A significant feature of the invention is that it makes use of a cylinder serving as a mixing chamber and turnable by a single control element, the cylinder functioning as a valve for gas and air admitted therein, thereby providing a unit of exceptionally simple and low cost design.

Also an object of the invention is to provide an air-gas controller unit of the above type having incorporated therein means precisely to pre-set the ratio of air and gas fed into the mixing chamber.

An important advantage of the invention is that the unit may be operated by unskilled personnel, for all an operator need do to raise or lower the intensity of the flame produced by a gas-fired burner supplied with an air-gas mixture by the unit, is to turn a control knob in one direction to raise the intensity and in the reverse direction to lower the intensity. The operator has no need, as with prior arrangements, to also adjust the ratio of gas to air each time an intensity adjustment is made to be sure that the ratio affords optimum burner efficiency.

Briefly stated, these objects are attained in an air-gas controller unit to supply a gas-fired burner with a combustible air-gas mixture, the unit serving to modulate the volumetric flow rate of the mixture without, however, altering the ratio of air to gas which is pre-set for optimum combustion efficiency. The unit includes a valve body whose cylindrical cavity accommodates a hollow cylinder functioning as a mixing chamber, one end of which is open to discharge the air-gas mixture into a mixture outlet in the valve body. The cylinder is turnable within the cavity from a maximum to a minimum valve setting by a rotary control element attached to its other end.

Formed in the cylinder is an air orifice which at maximum setting lies in full registration with a gas inlet in the valve body. Also formed in the cylinder is a gas orifice which are the maximum setting lies in registration with a gas inlet in the valve body. The relative portions of the orifices are such as to afford a desired ratio between the air and gas fed into the mixing chamber. As the cylinder is turned toward minimum setting, the air and gas orifices proceed in corresponding degrees to fall out of registration with their respective inlets, thereby adjusting the volumetric flow rate of air and gas admitted into the chamber while maintaining the ratio therebetween.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
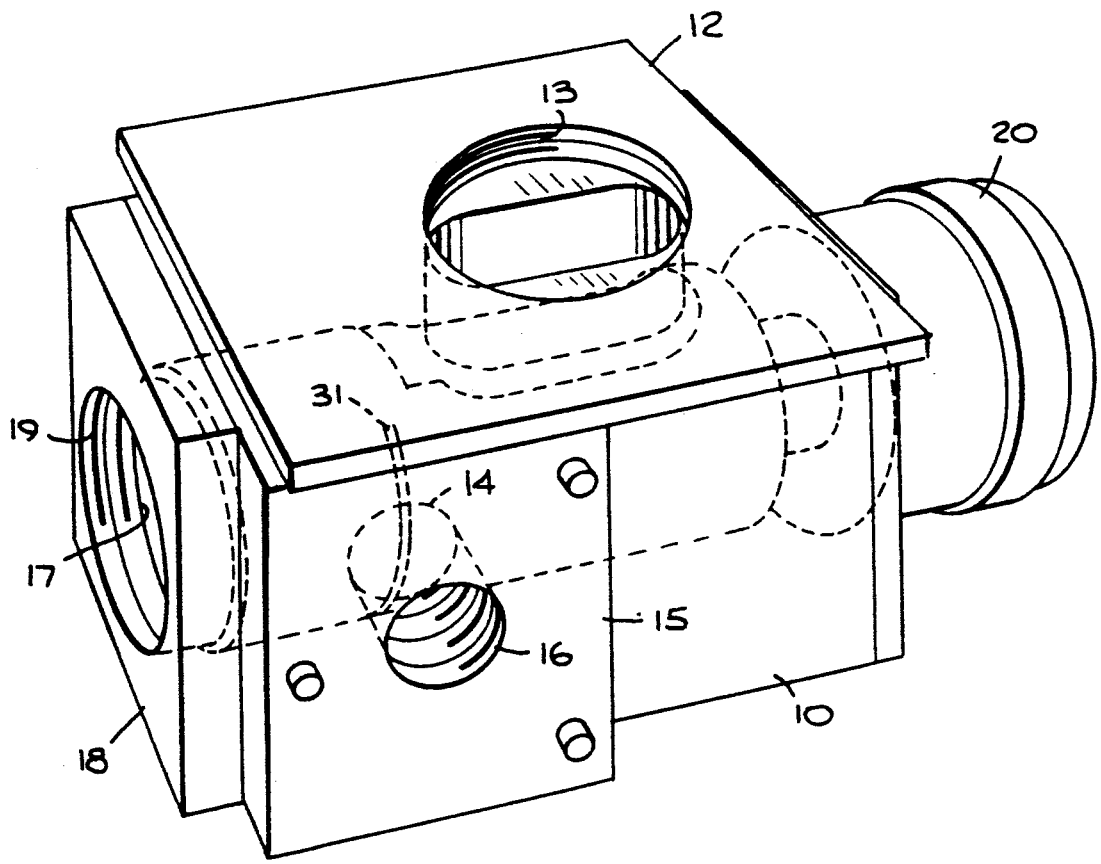
FIG. 1 is a perspective view of an air-gas controller unit in accordance with the invention.
Figure 2:
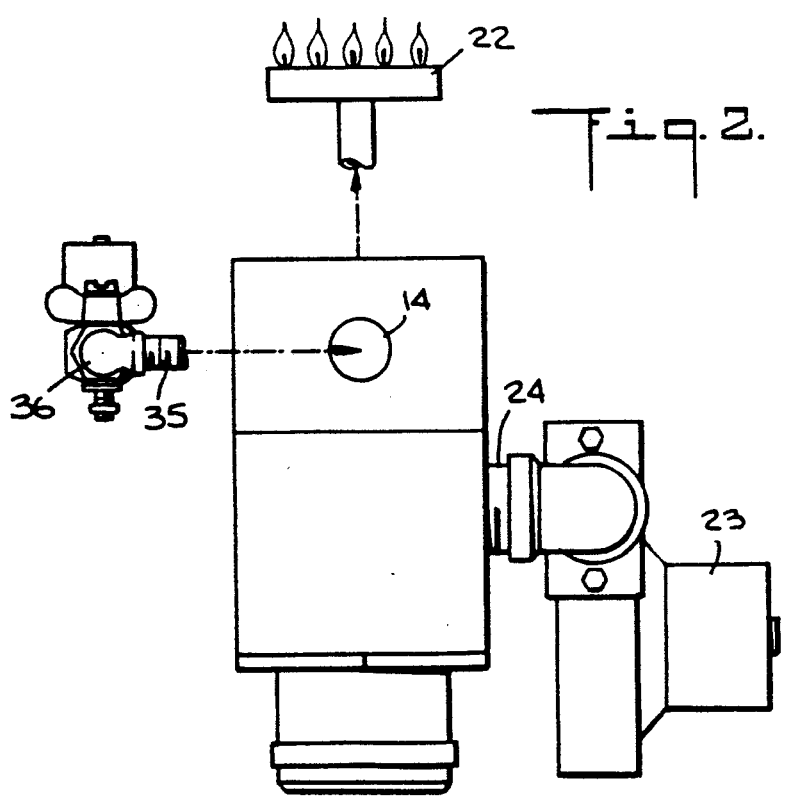
FIG. 2 illustrates how the unit is supplied with air and gas to produce a mixture which is fed to a gas-fired burner.

Referring now to FIGS. 1 and 2 which illustrate an air-gas controller unit in accordance with the invention, it will be seen that the unit includes a solid metal valve body 10 in box-like form. Formed on the top side of valve body 10 is a large oval-shaped air inlet 11. Attached to the top side of body 10 is a metal plate 12 having an internally-threaded circular bore 13 which exposes air inlet 11. When the unit is installed, the threaded end of a supply pipe leading to a source of pressurized air is screwed into bore 13.

Valve body 10 has formed on another side thereof a circular gas inlet 14. Attached to this side of the valve body is a metal plate 15 having an internally-threaded circular bore 16 therein which exposes gas inlet 14 and is of the same diameter. When the unit is installed, the threaded end of a supply pipe leading to a source of pressurized gas is screwed into bore 16.

A circular air-gas mixture outlet 17 is formed in one end of the valve body, and attached to this end is a metal plate 18 having an internally-threaded bore 19 of the same diameter, so that the mixture outlet 17 can be coupled to a pipe to a gas-fired burner.

Extending axially from the other end of valve body 10 is a cylindrical knob 20. When the knob is turned, it functions to adjust the volumetric flow rate of the air-gas mixture discharged from outlet 17 into a pipe 21, which, as shown in FIG. 2, leads to a gas-fired burner 22. This burner may be of any known type.

Pressurized air is provided by a motor-driven fan 23 coupled by a pipe 24 to bore 13 in plate 12 aligned with air inlet 11. Pressurized gas from a suitable source is fed into gas inlet 14 of the valve body through a pipe 35 coming from an external valve 36. External valve 35 is adjustable to set the "high fire" condition of the burner, so that when the unit is at its maximum setting, the amount of gas fed into burner 22 is determined by the setting of the external valve.

Figure 3:
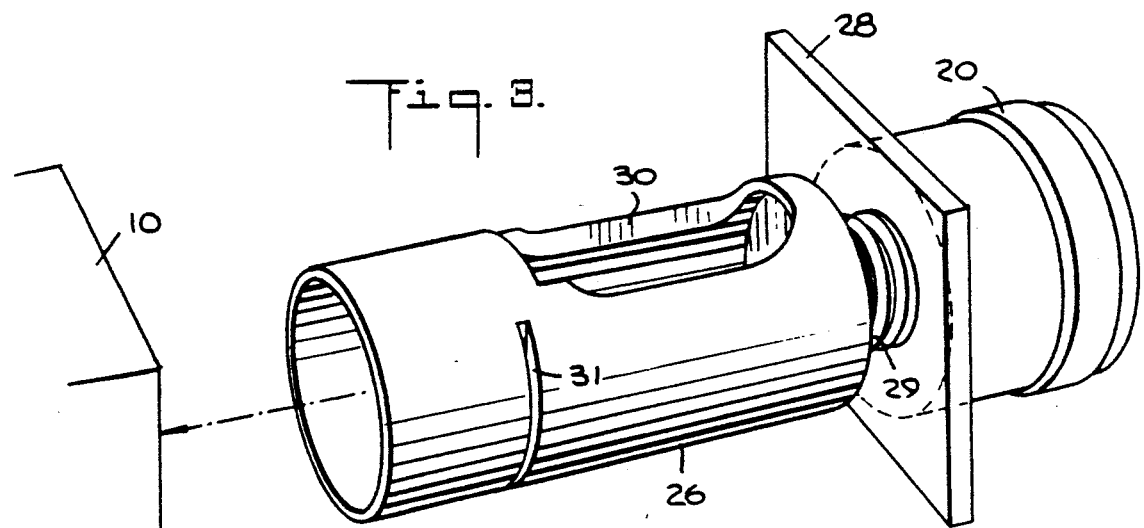
FIG. 3 shows, in perspective, the mixing chamber cylinder of the unit removed from the cavity of the valve body.
Figure 4:
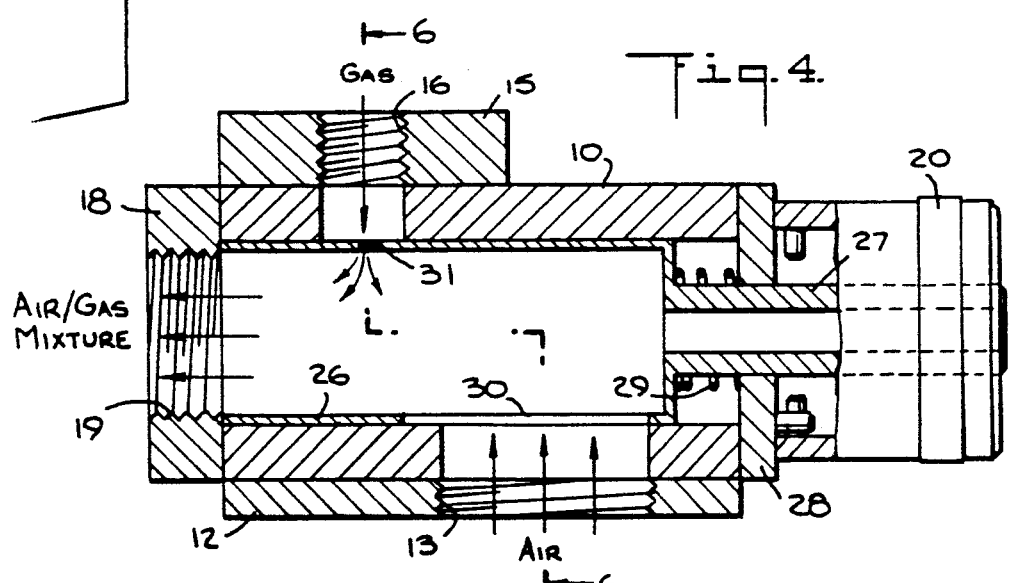
FIG. 4 is a longitudinal section taken through the unit.

Valve body 10, as shown in FIGS. 3 and 4, is provided with a cylindrical cavity 25 dimensioned to slidably receive a hollow cylinder 26 which acts as the mixing chamber of the unit. One end of cylinder 26 is open to discharge the air-gas mixture into the mixture outlet 17 at the corresponding end of the valve body. The other and closed end of the cylinder is joined to a stem 27 which extends through an opening in an end plate 28 attached to this end of the valve body, control knob 20 being keyed to the stem. The knob acts to turn the cylinder from a minimum to a maximum setting.

Surrounding stem 27 and interposed between the end of cylinder 26 and plate 28 is a helical spring 29 which urges the cylinder toward the air-gas outlet and thereby presses knob 20 against the outer surface of end plate 28.

Figure 7:
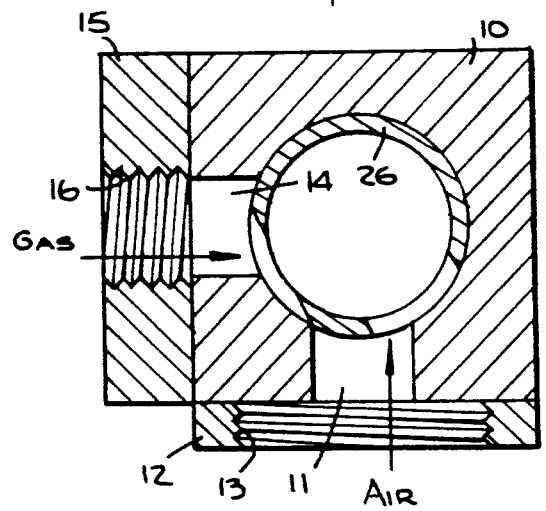
FIG. 7 is the same as FIG. 6 but with the cylinder turned to a different position.

Formed in hollow cylinder 26 is a large, longitudinally-extending, generally oval shaped air orifice 30, one end of which is adjacent the closed end of the cylinder. At the maximum setting of the unit, air orifice 30 is in full registration with air inlet 11, but when the cylinder is turned toward the minimum setting, orifice 30 proceeds to fall out of registration with the air inlet. This is illustrated in FIG. 7 which shows the oval air inlet 11 in the valve body partially blocked by air orifice 30 in the cylinder.

Figure 8:
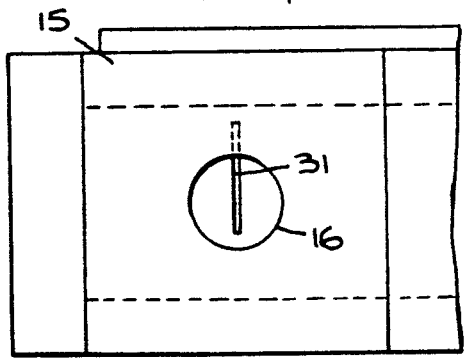
FIG. 8 illustrates the relationship of the gas orifice in the cylinder to the gas inlet in the valve body.
Figure 9:
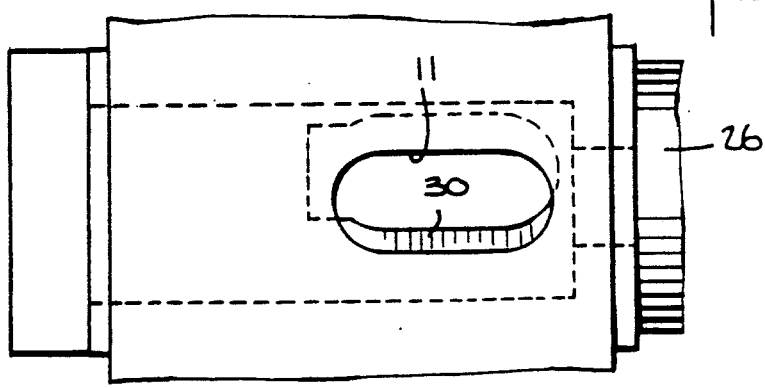
FIG. 9 illustrates the relationship of the air orifice in the cylinder to the air inlet in the valve body.

Also formed in hollow cylinder 26 is a slit 31 which is adjacent the other end of the cylinder and lies in a circumferential plane normal to the axis of the cylinder. At the maximum setting of the unit, slit 31, as shown in FIG. 8, lies in full registration with the circular gas inlet 14 in the valve body. But as the cylinder is turned toward the minimum setting, the gas slit proceeds to fall out of registration with inlet 14 to a degree corresponding to the degree to which air orifice 30 falls out of registration with its inlet.

For complete combustion, the ratio of air to gas must be the stoichiometric ratio, and this depends on the gaseous fuel being used. But regardless of this ratio, there is much more air than gas. In the unit in accordance with the invention, the ratio of air-to-gas is determined by the relative dimensions of the air and gas orifices. These relative dimensions, as the unit goes from its maximum setting to its minimum setting, is maintained, for as the cylinder is turned, the air and gas orifices are concurrently reduced in size in corresponding degrees. Thus at the midpoint in the range, the air and gas orifices are both half open, and as one proceeds toward the minimum setting, these orifices are both three quarters closed, etc.

When the knob is turned to cause the orifices to progressively open, then as one goes from the minimum to the maximum setting, the relative orifice dimensions remain unchanged to maintained the desired air-to-gas ratio.

Thus the unit acts concurrently to open or close the air and gas orifices to an increasing degree, and in doing so to vary the volumetric flow rate of gas and air fed into the common mixture chamber from which the mixture is fed to the gas-fueled burner. However, the ratio of gas to air, which is set by the relative orifice dimensions for optimum burner combustion efficiency, is not altered as the unit is operated.

Figure 5:
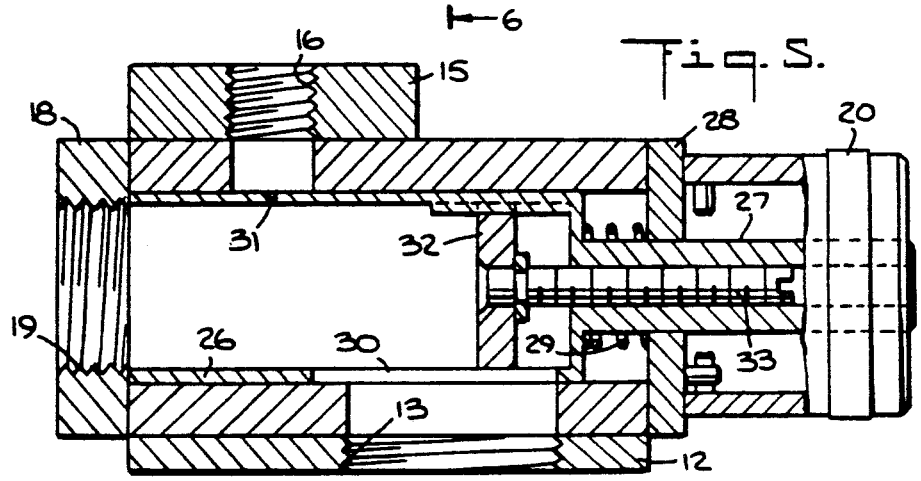
FIG. 5 illustrates, in perspective, a modified cylinder.
Figure 6:
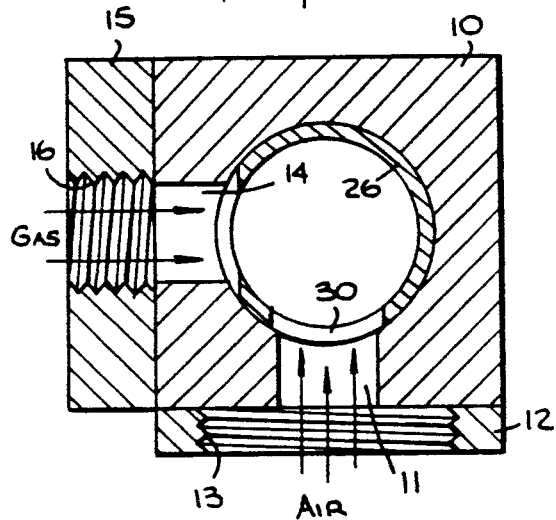
FIG. 6 is a transverse section taken in the planes indicated by line 6—6 in FIG. 4.

In the unit arrangement shown in FIGS. 1 to 8, the ratio of air to gas fed into the mixing chamber is fixed to satisfy a given stoichiometric ratio requirement. But it may be necessary to change this ratio to satisfy other requirements. To this end, cylinder 26 shown in FIG. 5 is provided with a shutter disc 32 which is mounted for movement within the hollow cylinder on a lead screw 33 which extends through hollow stem 27 and can be turned by a tool inserted in the stem. Disc 30 is keyed to the wall of the cylinder, so that it cannot turn, but can only advance axially as lead screw 33 is turned. When the disc is advanced it reduces the effective size of air orifice 30, for air can enter the mixing chamber only through the portion of the orifice that is not blocked by the disc.

While there has been shown and described a preferred embodiment of an air-gas controller unit in accordance with the invention, it will be appreciated that many changes and modifications may be made therein without, however, departing from the essential spirit thereof.

In the embodiment shown in FIGS. 4 and 5, cylinder 26 is of uniform external diameter throughout its length and the diameter closely matches the internal diameter of the cylindrical cavity 25 within valve body 10. In order to ensure a leak-proof air-gas controller, in practice the front section of cylinder 26 which includes gas slit 26 is preferably slightly tapered and the corresponding section of cavity 25 has a complementary taper, spring 29 acting to urge the tapered front section of cylinder 26 into the tapered cavity section. This tapered arrangement provides a gas tight fit between the cylinder and the valve body and thereby avoids gas leakage.

I claim:

1. A controller unit adapted to supply a combustible air-gas mixture to a gas-fired burner, said unit comprising:

(a) A valve body having a cylindrical cavity therein aligned with an air-gas mixture outlet at one end of the body, an air inlet being formed at one side of the body and a gas inlet being formed at another side of the body, said air inlet and said gas inlet communicating with said cavity at axially displaced positions; and (b) a hollow cylinder functioning as a mixing chamber received in said cavity and turnable therein from a maximum to a minimum setting, one end of said cylinder being open and being in alignment with said outlet to discharge an air and gas mixture from said chamber into said outlet, said cylinder having an air orifice therein which at said maximum setting lies in registration with said air inlet whereby as the cylinder is turned from the maximum to the minimum setting, the air orifice proceeds to fall out of registration, said cylinder having a gas orifice therein whose dimensions are small relative to those of the air orifice to established a desired air-to-gas ratio and which at said maximum setting lies in registration with said gas inlet whereby as the cylinder is turned from the maximum to the minimum setting, the gas orifice proceeds to fall out of registration to the same degree as the air orifice, whereby as the cylinder is turned it acts to adjust the volumetric flow rate of air and gas admitted into the mixing chamber while maintaining the ratio therebetween.

2. A unit as set forth in claim 1, wherein said cylinder is provided with a stem projecting out of the other end of the body to facilitate turning of the cylinder.

3. A unit as set forth in claim 2, wherein said stem passes through an end plate attached to said other end of the body, and a helical spring surrounding said stem and interposed between the end plate and the cylinder to bias the cylinder.

4. A unit as set forth in claim 3, further including a knob keyed to the stem.

5. A unit as set forth in claim 1, wherein said air orifice has an elongated oval form which extends along the cylinder.

6. A unit as set forth in claim 1, wherein said gas orifice is defined by a slit which lies in a circumferential plane normal to the axis of the cylinder.

7. A unit as set forth in claim 1, wherein said air and gas orifices have relative dimensions producing a ratio which is stoichiometric.

8. A unit as set forth in claim 1, further including a disc which is mounted on a screw within the hollow cylinder, which when the screw is turned acts to reduce the effective dimensions of the air orifice and in doing so the ratio of air to gas of said mixture.

* * * * *